(12) United States Patent
Wu

(10) Patent No.: US 7,173,813 B2
(45) Date of Patent: Feb. 6, 2007

(54) ELECTRONIC DEVICE HAVING DUAL ADJUSTABLE PRESS SWITCHES AND ITS METHOD

(75) Inventor: Yaz-Tzung Wu, Taipei (TW)

(73) Assignee: Inventec Corporation, Taipei (TW)

( * ) Notice: Subject to any disclaimer, the term of this patent is extended or adjusted under 35 U.S.C. 154(b) by 264 days.

(21) Appl. No.: 11/007,249

(22) Filed: Dec. 9, 2004

(65) Prior Publication Data
US 2006/0126280 A1 Jun. 15, 2006

(51) Int. Cl.
*G06F 1/20* (2006.01)
(52) U.S. Cl. ..................... 361/679; 361/681; 361/683
(58) Field of Classification Search ............... 361/679, 361/681, 683
See application file for complete search history.

(56) References Cited

U.S. PATENT DOCUMENTS 5,568,358 A * 10/1996 Nelson et al. ............. 361/681
5,708,562 A * 1/1998 Agata et al. ............... 361/683
2004/0233159 A1* 11/2004 Badarneh .................. 345/156
2006/0018089 A1* 1/2006 Chou ........................ 361/683

* cited by examiner

*Primary Examiner*—Yean-Hsi Chang
(74) *Attorney, Agent, or Firm*—Bacon & Thomas, PLLC

(57) ABSTRACT

The present invention discloses an electronic device having dual adjustable press switches and its method, wherein two adjustable press switch components on an electronic device are used for pivotally coupling a main system and a LCD screen thereof, and the press switches are coupled to a power saving control unit and a screen switching unit in the main system by an electric wire. When one press switch is adjusted to an angle and pressed, a power saving signal will be sent to the power saving control unit to turn off the back light of the LCD screen and set the electronic device to the power saving mode. When the other press switch is adjusted to another angle and pressed, a screen switching signal will be sent to the screen control unit for switching the screen into a minimized screen mode.

7 Claims, 3 Drawing Sheets

ELECTRONIC DEVICE HAVING DUAL ADJUSTABLE PRESS SWITCHES AND ITS METHOD

FIELD OF THE INVENTION

The present invention relates to electronic devices having dual adjustable press switches and its method, more particularly to an electronic device (such as a notebook computer) having at least one adjustable press switch disposed on each of both sides of at least one pivot on the electronic device for pivotally coupling a main system and a LCD screen of the electronic device, enabling a user to adjust back light of the LCD screen and set the electronic device to the power saving mode, or switch the screen on the current LCD screen into a minimized screen mode for preventing confidential information displayed on the screen from being viewed by others when the user is operating the electronic device, through rotating the LCD screen toward the main system in order to activate the press switch being set in a predetermined angle.

BACKGROUND OF THE INVENTION

As science and technology advances day after day, all kinds of electronic devices are available to our expected standard. For example, various different models of notebook computers, mobile phones, and the like have more powerful functions and finer stylish designs; and the competition among manufacturers is getting severer than ever. Taking notebook computers for example, we know that the research and development of notebook computer chasses keeps adopting the all-in-one design, in addition to the trend of designing a notebook computer in a lighter, thinner, shorter and more compact manner. Therefore, the all-in-one model becomes another name of the current notebook computer, and its severe competition is beyond description, and thus every manufacturer has higher and higher demand for the quality of its products.

No matter which model of notebook computer, its basic architecture always comes with a main system and a liquid crystal display (LCD) screen, wherein the corresponding sides of the main system and the LCD screen are pivotally coupled by at least one pivot, such that if the LCD screen is not in use, a user can rotate the LCD screen about the pivotal connection to cover the LCD screen onto the main system; if it is necessary to use the LCD screen, a user just needs to turn over the LCD screen to an appropriate viewing angle for the required computer operations. Further, when the LCD screen is in use, its back light is on; and when the LCD screen is covered onto the main system, its back light is off and thus the internal hardware power supply system of the notebook computer is turned off at the same time to save power of the notebook computer. Therefore, traditional notebook computers can effectively save power and generally includes a "press switch" disposed at the corresponding sides of the main system and the LCD screen, such that if the LCD screen is shut to press the "press switch" (generally occurs when the LCD screen covers onto the main system; or in other words, the included angle between the surface of the LCD screen and the surface of the main system is approximately zero degree.). Therefore, the back light of the LCD screen is turned off for the power saving effect. However, if a user has to leave for some reason while operating the computer, the user usually shuts the LCD screen and thinks that the back light is off. In fact, the user leaves and shuts the LCD screen without actually pressing the "press switch", and such negligence will cause a waste of electric power. Furthermore, while users are operating a computer, there may be people walking around. Users often worry about their confidential information displayed on the computer screen being viewed by other people. Since users usually will not shut the screen display to an included angle of zero degree at once, since it may make users psychologically feel and physically look suspicious of dong bad things at that time if they do so.

Thus, it seems that the power saving design of traditional notebook computers is not humanistic and perfect, and also causes lots of troubles and inconvenience to users, not mentioning its incapability of satisfying and complying with the current requirements. The foregoing factors drive manufactures to conduct research and development and come up with an innovative idea of a multifunctional dual adjustable press switches to provide better and more powerful functions to meet user's requirements.

SUMMARY OF THE INVENTION

From the description of the aforementioned prior arts, it is obvious that present notebook computers usually install a "press switch" disposed between the corresponding sides of the main system and the LCD screen to effectively save the power of the notebook computer. However, the design of the "press switch" is not humanistic and perfect, which causes lots of troubles and inconvenience to the use of computers. In view of the foregoing shortcomings and the actual requirements of the market and users, the inventor of the present invention based on years of experience in the related field to conduct extensive researches and developments and finally developed the electronic device having dual adjustable press switches in accordance with the present invention, in hope of satisfying users' requirements by this innovative idea.

The primary objective of the present invention is to provide an electronic device having dual adjustable press switches and its method; wherein a first adjustable press switch component and a second adjustable press switch component are disposed on each of both sides of at least one pivot on an electronic device for pivotally coupling the main system and the LCD screen of an electronic device, and the press switches are coupled to a power saving control unit in the main system through an electrically conductive wire. If the first press switch is adjusted to an angle (between 60 degrees and 0 degree) and pressed, then a power saving signal will be sent to the power saving control unit to turn off the back light of the LCD screen and set the electronic device to the power saving mode. If the second press switch is adjusted to an angle (between 80 degrees and 60 degrees) and pressed, then a screen switching signal will be sent to the screen control unit for switching the screen on the current LCD screen into the minimized screen mode. Therefore, the confidential information displayed on the screen will not be viewed by other people when a user is operating the electronic device.

Another objective of the present invention is to provide an electronic device having dual adjustable press switches and its method; wherein the functions of switching on/off the first and second press switches can be chosen by a user from an application program to provide timely services to the user.

The above and other objects, features and advantages of the present invention will become apparent from the following detailed description taken with the accompanying drawings.

DETAILED DESCRIPTION OF THE PREFERRED EMBODIMENTS

Figure 1:
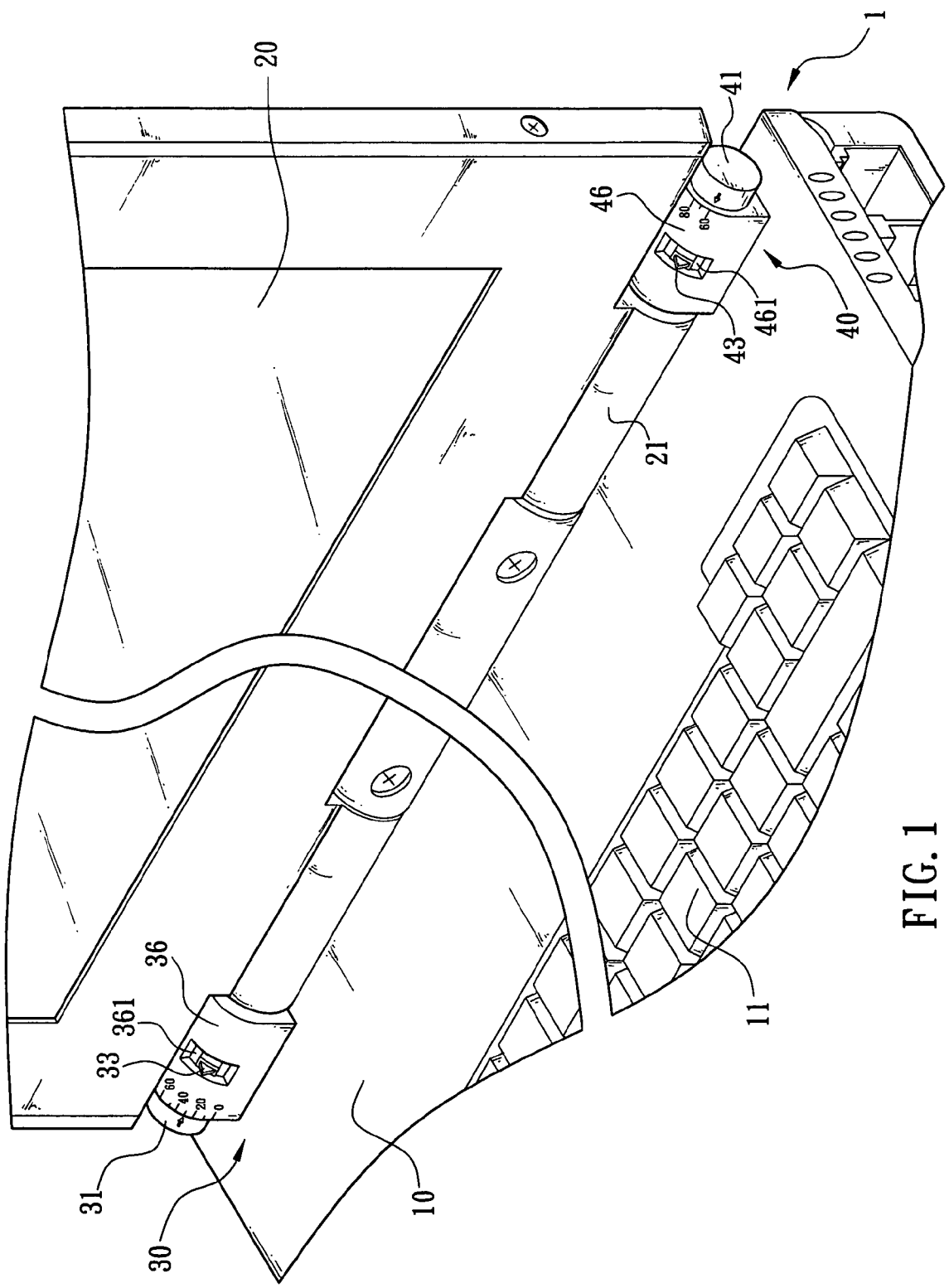
FIG. 1 is an illustrative view of a partial look of the present invention.

Please refer to FIG. 1 for the electronic device having dual adjustable press switches and its method in accordance with the present invention. The electronic device 1 comprises a main system 10 and a liquid crystal display (LCD) screen. In a preferred embodiment of the present invention, the electronic device is a notebook computer, and its main system 10 comprises a keyboard 11, a touch control panel (not shown in the figure), and at least one pivot 21 disposed at the corresponding sides of the main system 10 and the LCD screen 20 for pivotally coupling the main system 10 and the LCD screen 20, such that when the LCD screen 20 is not in use, the LCD screen 20 is rotated about the pivot 21 to cover onto the main system 10; when the LCD screen 20 is in use, the LCD screen 20 is turned over an appropriate viewing angle for the user's operations.

Figure 2:
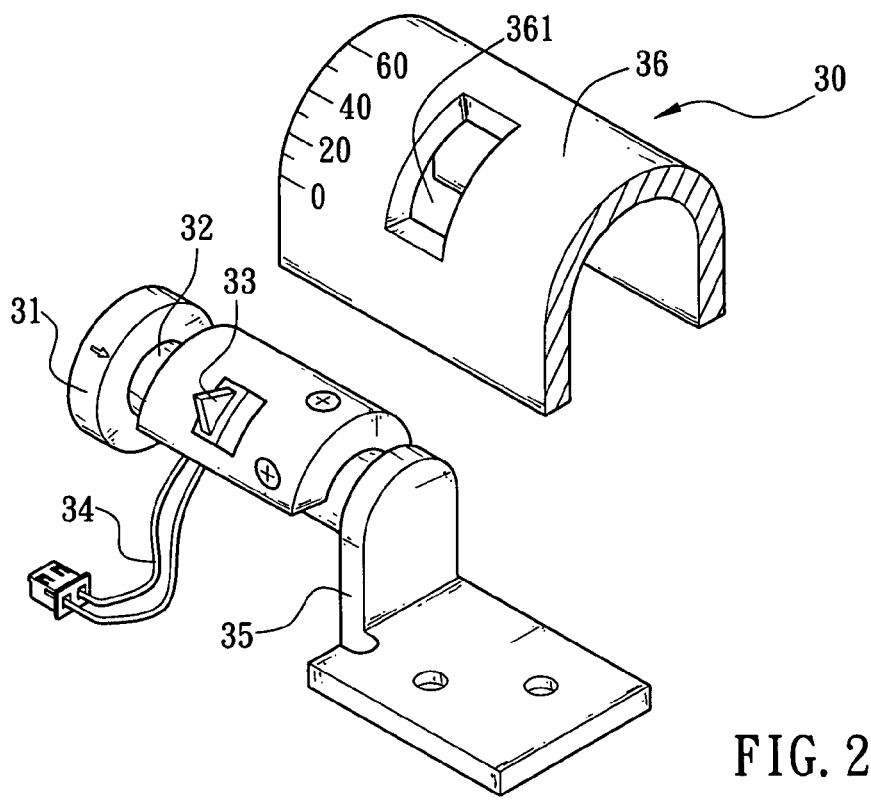
FIG. 2 is an exploded view of the first adjustable press switch component of the present invention.
Figure 5:
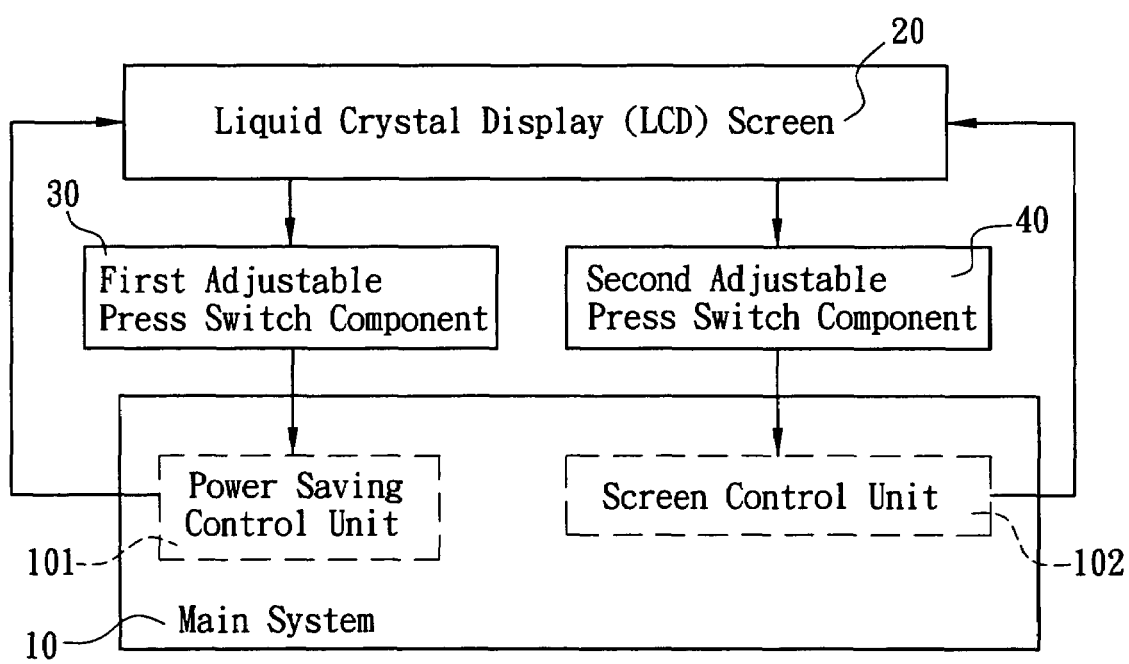
FIG. 5 is a control block diagram of operating an electronic device of the present invention.

Please refer to FIGS. 1 and 2. With the foregoing basic architecture, the technology of the present invention can be implemented as follows. An adjustable press switch component 30 is disposed on one side of at least one pivot 21 of the main system 10 and the LCD screen 20. The adjustable press switch component 30 comprises a knob 31; a shaft 32 disposed at the center of one side of the knob 31 facing the pivot 21; a press switch 33 protruded from the shaft 32 and coupled to a power saving unit 101 in the main system 10 through an electrically conductive wire 34 as shown in FIG. 5; such that when the press switch 33 is pressed, a power saving signal is sent to the power saving control unit 101 to turn off the back light of the LCD screen 20 and set the LCD screen to a power saving mode.

Further, the end of the shaft 32 not having a knob 31 is pivotally coupled to a fixed base 35 on the main system 10 as shown in FIG. 2, such that the adjustable press switch component 30 can be mounted onto the main system 10; and in the meantime, the knob 31 can be rotated at the pivotally connected end of the fixed base 35 and the shaft 32. Further, the adjustable press switch component 30 disposed on the shaft is covered by a shaft cover 36, and a through hole 361 is disposed at the corresponding position of the shaft cover 36 and the press switch 33 for exposing the press switch 33, and the shaft cover 36 is marked with an adjusted angle for the power saving mode. In this embodiment, the adjusted angle ranges from 60 degrees to 0 degree, so that a user just needs to adjust the knob 31 by moving the press switch 33 to a specific angle from 60 degrees to 0 degree and the LCD screen 20 covers and presses onto the press switch 33 at that angle, the power saving mode will be disabled automatically.

Figure 3:
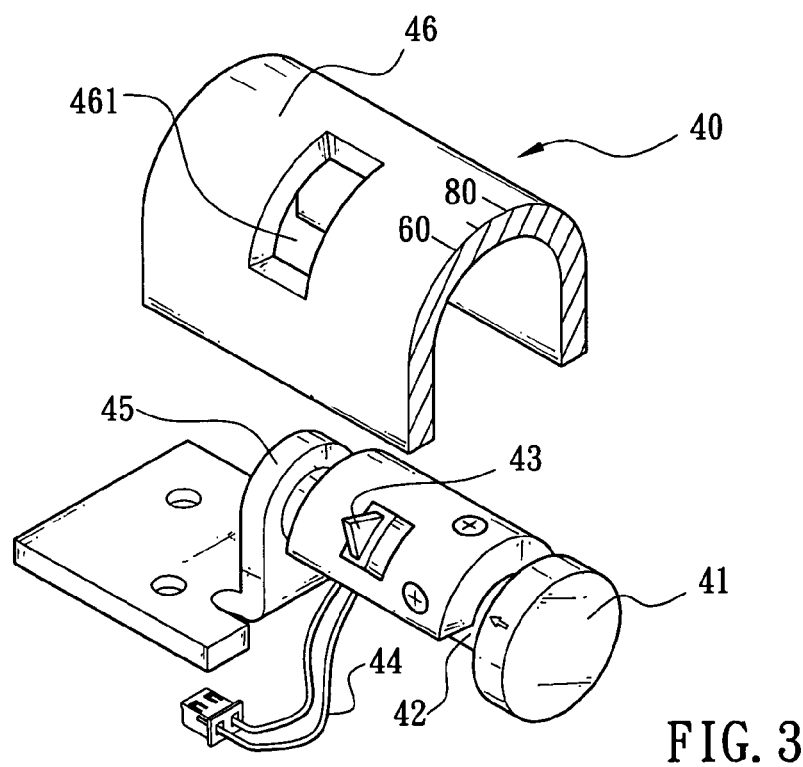
FIG. 3 is an exploded view of the second adjustable press switch component of the present invention.

Please refer to FIGS. 1 and 3. A second adjustable press switch component 40 is disposed on the other side of at least one pivot 21 of the main system 10 and the LCD screen 20, and the second adjustable press switch component 40 has the same structure as the abovementioned press switch component 30 and also comprises a knob 41; a second shaft 42 disposed at the center of one side of the knob 31 facing the pivot 21; a second press switch 43 protruded from the shaft 42 and coupled to a screen switching unit 102 in the main system 10 through an electrically conductive wire 44 as shown in FIG. 5; such that when the second press switch 43 is pressed, a screen switching signal is sent to the screen switching control unit 102 to switch the current screen of the LCD screen to a minimized screen mode.

Further, the end of the shaft 42 not having a knob 41 is pivotally coupled to a fixed base 45 mounted on the main system 10 as shown in FIG. 3, such that the second adjustable press switch component 40 can be mounted onto the main system 10; and in the meantime, the second knob 41 can be rotated at the pivotally connected end of the fixed base 45 and the shaft 32. Further, the second adjustable press switch component 40 disposed on the second shaft 42 is covered by the second shaft cover 46, and a through hole 461 is disposed at the corresponding position of the second shaft cover 46 and the second adjustable press switch 43 for exposing the second adjustable press switch 43, and the second shaft cover 46 is marked with an adjusted angle for the screen switching mode. In this embodiment, the adjusted angle ranges from 80 degrees to 60 degrees, so that a user just needs to adjust the second knob 41 to move the second adjustable press switch 43 to a specific angle from 80 degrees to 60 degrees and the LCD screen 20 covers and presses onto the second press switch 43 at that angle, and then the screen will be switched into the minimized screen mode. In general, when the LCD screen 20 is turned over to an angle of less than 80 degrees, we are unable to see the contents displayed on the screen clearly and thus can prevent confidential information from being viewed by other people.

Figure 4:
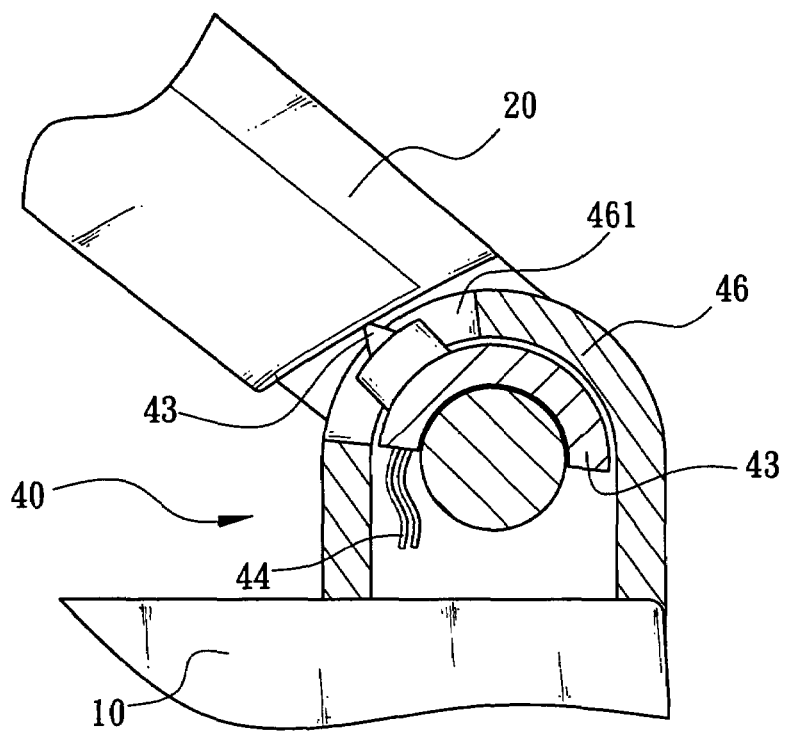
FIG. 4 is a side view of the LCD screen being shut to press the second switch press according to the present invention.

Therefore, when a user is using the electronic device (such as a notebook computer) having dual adjustable press switch components 30, 40 and has adjusted the second press switch 43 on the second adjustable press switch component 40 to a specific angle (such as an angle between 80 degrees to 60 degrees), the operation and processing depicted in FIGS. 4 and 5 are described as follows:

Firstly, when the LCD screen 20 is shut to press the second press switch 43 to a specific angle, the second press switch 43 will send a screen switching signal to the screen control unit 102 for switching the screen into a minimized screen mode; and after the screen control unit 102 receives the signal for switching the screen to a minimized screen mode, it will send a control signal to the LCD screen 20 to switch the current screen into a minimized screen mode. Therefore, the screen can be switched into a minimized screen to prevent other people viewing the confidential information displayed on the screen while the user is operating the electronic device.

Further, in this embodiment, when a user uses an electronic device 1 (which is a notebook computer) having dual adjustable press switch components 30, 40 and has adjusted the press switch 33 on the adjustable press switch component 30 to a specific angle (such as an angle between 60 degrees and 0 degree), the operation and processing depicted in FIGS. 2, 3 and 4 are described as follows:

Firstly, when the LCD screen 20 is shut to press the press switch 33 to a specific angle, the press switch 33 will send a power saving signal to the power saving control unit 101 for turning off the back light of the LCD screen 20; and after the power saving control unit 101 has received the power saving signal for turning off the back light of the LCD screen 20, it will send an off signal to the LCD screen 20 to turn off the back light and set the LCD screen 20 to a power saving mode.

Further, the functions of switching on/off the first press switch 33 and the second press switch 34 is selected by users through an application program to effectively satisfy user's requirements.

While the invention has been described by means of specific embodiments, numerous modifications and variations could be made thereto by those skilled in the art without departing from the scope and spirit of the invention set forth in the claims.

What is claimed is:

1. An electronic device having dual adjustable press switches, comprising a main system, a liquid crystal display (LCD) screen, and at least one pivot being disposed at the corresponding side of said main system and said LCD screen for pivotally coupling said main system and said LCD screen; characterized in that:

an adjustable press switch component being disposed on one side of said pivot, and comprising:

a knob, having a shaft disposed on the center of a side of said knob facing said pivot;

a press switch, being protruded from said shaft and coupled to a power saving control unit in said main system by an electrically conductive wire, such that when said press switch is pressed, a signal is sent to said power saving unit to turn off the back light of said LCD screen and set said LCD screen to a power saving mode;

a fixed base, being mounted onto said main system and pivotally coupled to one end of said shaft that does not have a knob, and said knob rotating about the position of said pivotal connection;

a shaft cover, for covering said shaft;

a through hole, being disposed at a position corresponding to said press switch for exposing said press switch.

2. The electronic device having dual adjustable press switches of claim 1, wherein said shaft cover is marked with an adjusted angle for a power saving mode.

3. The electronic device having dual adjustable press switches of claim 1, wherein said shaft has a second adjustable press switch component disposed on another side, comprising:

a second knob having a second shaft disposed at the center of a side of said second knob facing said pivot;

a second press switch, being protruded from said second shaft and coupled to a screen control unit in said main system by an electrically conductive wire, such that when said second press switch is pressed, a signal is sent to said screen control unit to switch the current screen on said LCD screen to a minimized screen mode;

a second fixed base, being mounted onto said main system and pivotally coupled to one end of said second shaft that does not have a knob, and said second knob rotating about the position of said pivotal connection;

a second shaft cover, for covering said second shaft;

a second through hole, being disposed at a position corresponding to said second press switch for exposing said second press switch.

4. The electronic device having dual adjustable press switches of claim 3, wherein said second shaft cover is marked with an adjusted angle for a power saving mode.

5. A method of having dual adjustable press switches, comprising the steps of:

pivotally coupling a press switch of an adjustable press switch component on one side of at least one pivot of an electronic device;

said press switch sending a power saving signal to a power saving control unit in said electronic device for turning off the back light of a liquid crystal display (LCD) screen, when said LCD screen of said electronic device is shut to press said press switch to a predetermined angle; and said power saving control unit sending an off signal to said LCD screen to turn off the back light of said LCD screen and set said LCD screen to a power saving after receiving a power saving signal for turning off the back light of said LCD screen.

6. The method of having dual adjustable press switches of claim 5, comprising the steps of:

pivotally coupling a second press switch of a second adjustable press switch component on one side of at least one pivot of said electronic device;

said second press switch sending a screen switching signal to a screen control unit in said electronic device for switching the screen of said liquid crystal display (LCD) screen into a minimized screen mode, when said LCD screen of said electronic device is shut to press said second press switch to a predetermined angle; and said screen control unit sending a control signal to said LCD screen to switch the screen of said LCD screen to a minimized screen mode after receiving a screen switching signal for minimizing the screen.

7. The method of having dual adjustable press switches of claim 6, wherein said press switch and said second press switch are selectively enabled and disabled through an application program.

* * * * *